Oct. 21, 1930.  C. N. MITCHELL  1,778,905
SHOCK ABSORBER FOR VEHICLES
Filed June 13, 1927  2 Sheets-Sheet 1
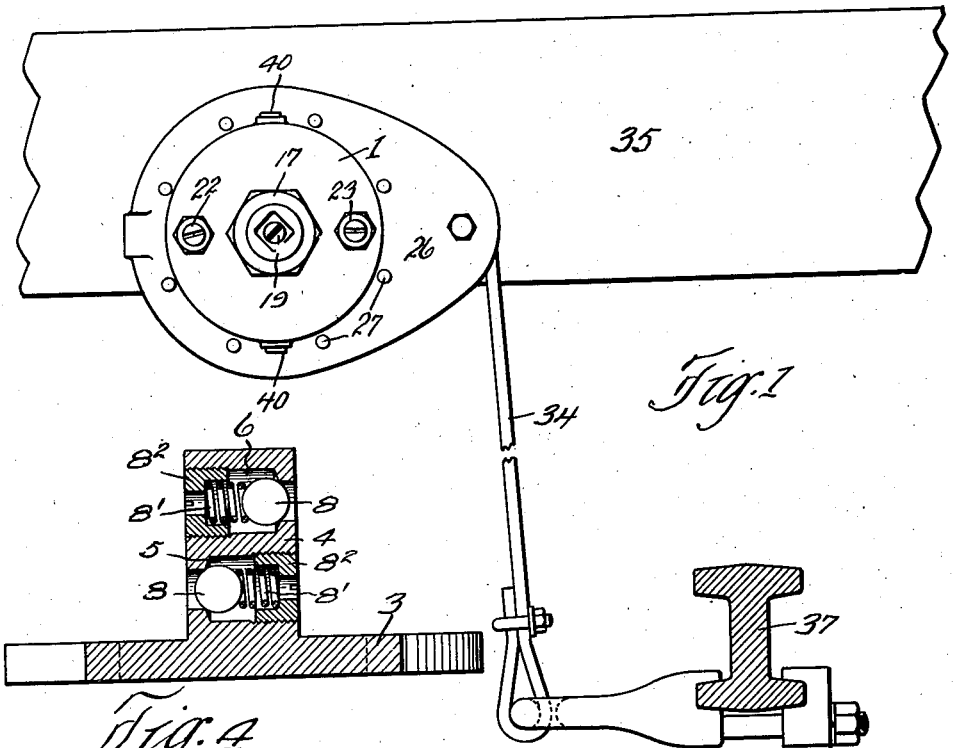
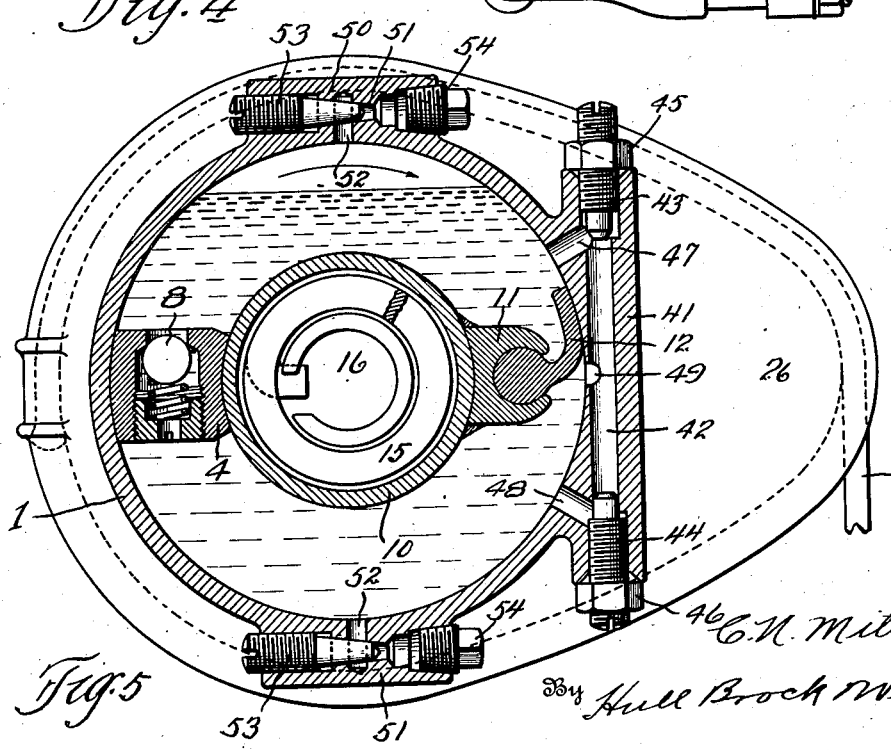
Inventor
C. N. Mitchell
By Hull Brock West
Attorney Oct. 21, 1930.     C. N. MITCHELL     1,778,905
SHOCK ABSORBER FOR VEHICLES
Filed June 13, 1927     2 Sheets-Sheet 2

Inventor
C. N. Mitchell
By Hull Brock & West
Attorney

Patented Oct. 21, 1930

1,778,905

UNITED STATES PATENT OFFICE

COURTNEY N. MITCHELL, OF CLEVELAND, OHIO, ASSIGNOR OF ONE-THIRD TO THOMAS B. McADAMS AND ONE-THIRD TO LAMAR R. JONES, BOTH OF CLEVELAND, OHIO

SHOCK ABSORBER FOR VEHICLES

Application filed June 13, 1927. Serial No. 198,475.

This invention relates to cushioning devices for vehicles and particularly to that type of cushioning device which is adapted to reduce or check the rebound of the vehicle body after a sudden compression of the body springs due to the vehicle riding over rough road beds.

More particularly, the invention relates to shock absorbers of the hydraulic type which are designed to be interposed between the body and the axle or springs of vehicles in order to compensate or check the rebounding action of the springs after they have been placed under compression due to the vehicle passing over uneven places in the road.

The main object of the invention is to provide a shock absorber of the class described which is simple in construction, effective in operation, readily assembled and disassembled and which comprises comparatively few parts.

Another object of the invention is to provide a shock absorber of the character set forth in which practically all of the parts may be made of metal stampings thus materially cheapening the construction and adapting the device for quantity production at comparatively low cost.

Figure 2:
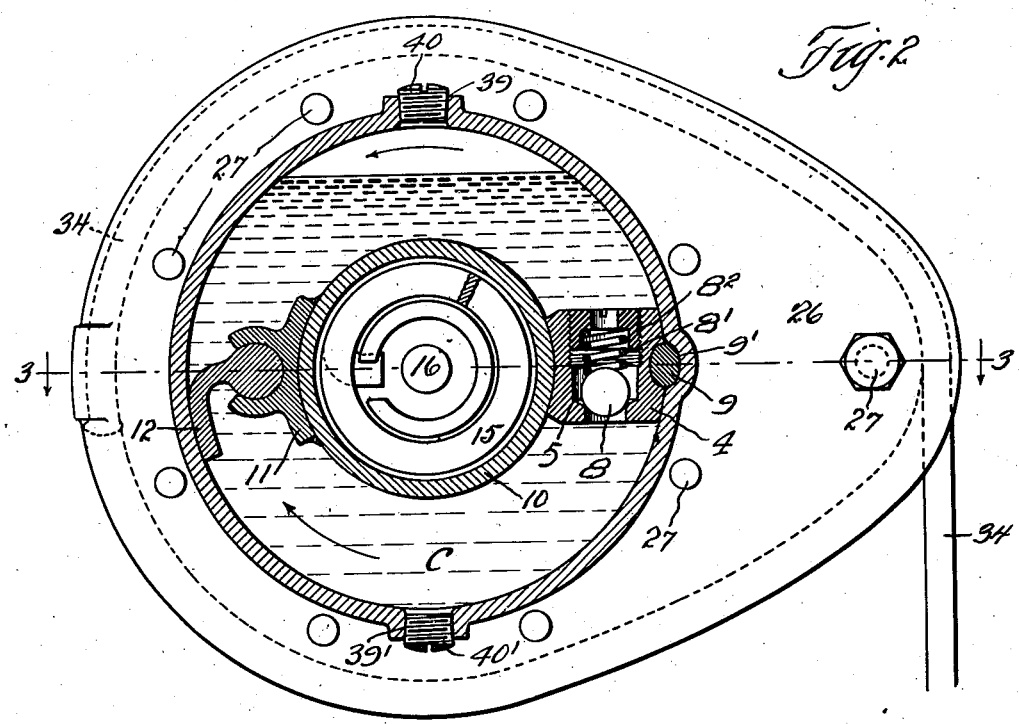
Figure 3:
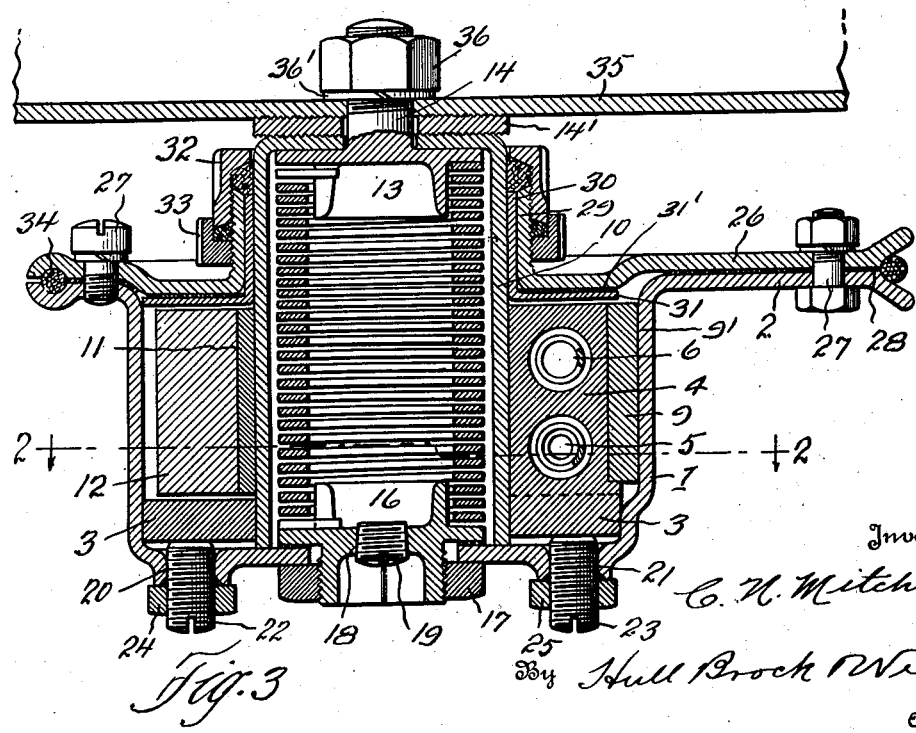

Further and more limited objects of the invention will appear as the description proceeds and by reference to the accompanying drawing in which Fig. 1 is a view partly in side elevation and partly in section showing the shock absorber attached to a vehicle body and connected with the vehicle axle; Fig. 2 is a sectional view on the line 2—2 of Fig. 3 looking in the direction of the arrow; Fig. 3 is a horizontal sectional view on the line 3—3 of Fig. 2; Fig. 4 is an enlarged detail view of the block or plunger showing the manner of mounting the valves; and Fig. 5 is a view partly in side elevation and partly in vertical section showing a modification.

Referring now to the drawings, the numeral 1 designates a substantially cup-shaped housing or chamber provided with an overhanging peripheral flange 2 which is somewhat egg shaped and flared outwardly at its periphery, the purpose of which will hereinafter appear. Arranged within the housing or chamber 1 is an annular block 3 having a projection 4 thereon preferably integral therewith. The projection 4 is provided with a pair of openings 5 and 6 in which are arranged spring seated valves 7 and 8 seating in opposite directions. The projection 4 is preferably splined to the casing 1, by a key 9 so that the ring 3 and projection 4 move with the casing in a manner to be hereinafter more fully described. Fitting within the casing and contacting with the outer end or bottom thereof is a cup-shaped barrel 10, the outer end of the same fitting within the opening in the block 3 as shown most clearly in Fig. 3. A trunnion or lug 11 is preferably welded or brazed to the barrel 10 and pivotally secured thereto is a vane 12 which is shaped in section as shown most clearly in Figs. 2 and 3. Arranged within the barrel 10 is an anchor member 13 which is preferably welded to the barrel and provided with a threaded projection 14 which extends through an opening in the end of the barrel as shown most clearly in Fig. 3. Also arranged within the barrel 10 is a coil spring 15, the upper end of which engages in a recess or notch in the anchor member 13. The lower end of the coil spring 15 engages in a similar notch in an anchor member 16 which is rigidly secured to the housing 1 by means of a nut 17 as shown in Fig. 3. The anchor member 16 is provided with an opening 18 which is closed by a removable plug 19 and through which lubricant may be supplied to the interior of spring barrel. The outer or bottom end of the chamber 1 is provided with a pair of oppositely disposed openings 20 and 21 which are adapted to receive screw plugs 22 and 23 respectively which serve to adjust the position of the block 3 within the housing and are held in adjusted position by lock nuts 24 and 25. A cover 26 closes the upper end of the housing and fits over the flange 2 and is secured thereto by suitable bolts 27. A packing ring or gasket 28 is interposed between the flange 2 and cover 26 in order to provide a liquid tight joint. The cover 26 is provided with an upstanding annular flange 29 which is exteriorly threaded. Interposed between the flange 29 and the barrel 10 and pressed over the barrel 10 is a gasket or washer 30 which is shaped in section as shown most clearly in Fig. 3. The peripheral portion 31 of the washer 30 projects beneath the underside of the cover 26 and an annular washer or ring 31' fits loosely over the washer 30 and is disposed between the portion 31 and the cover 26 and serves to provide a liquid tight joint between the cover 26 and barrel 10. A pair of interlocking and overlapping rings 32 and 33 are threadedly secured over the flange 29 and suitable packing is provided to prevent leakage around and past the barrel 10. A flexible strap or cord 34 is secured at one side between complementary flanges on the cover 26 and the housing, as shown in Fig. 3, and extends about the periphery thereof as shown most clearly in Fig. 2. The reference character 37 designates a portion of a vehicle axle. The device is adapted to be secured to the chassis or body 35 by means of the threaded projection 14 which extends through an opening provided in the body 35 and is rigidly secured thereto by means of the nut 36 and washer 36'. A gasket or shim 14' which is serrated on both sides as shown in Fig. 3 is interposed between the body 35 and the end of the barrel 10 and serves to maintain a tight connection therebetween. The lower end of the flexible strap or collar 34 is adapted to be secured to the vehicle axle in any suitable manner.

The barrel 10 fitting within the housing, together with the cover plate 26, forms an annular chamber which is liquid tight and is adapted to be filled with liquid, preferably glycerine, up to the level shown in Fig. 2. This chamber is filled through an opening 39 normally closed by a screw plug 40. The block 3 fits loosely within the chamber and is freely slidable on the barrel 10 and the position of the same may be adjusted by the screws 22 and 23, as hereinbefore described, for varying the clearance at the ends of the vane 12 and the clearance at the inner end of the projection 4.

The coil spring 15 is maintained within the housing under compression and tends to force the housing outwardly or downwardly as seen in Fig. 3 and the washer or ring 31' which is interposed between the cover 26 and the overhanging portion 31 is clamped therebetween. It will therefore be clear that the ring 31 offers a frictional resistance to the turning of the housing about the barrel 10 and that as the hydraulic pressure is increased the frictional resistance is also increased. In other words, as the pressure within the housing is increased, the cover 26 is forced against the ring 31' to clamp the same between the flange 31 and the cover 26, thus tightening the joint at this point and increasing the frictional resistance between the rotatable cover 26 and the overhanging flange 31 and thus increasing the dampening effect of the shock absorber. The ring 31' rests loosely on the overhanging portion 31 of the washer 30. The washer 30 is press fitted over the barrel 10 so that it cannot rotate with the housing.

The projection 4 is provided with a pair of openings 5 and 6, as hereinbefore described, and arranged within these openings are valves 7 and 8 which are adapted to open in opposite directions. The valve 8 is shown in detail in Fig. 2 and is held in place by a coil spring 8' which bears against a plug $8^2$ threadedly secured in the opening. The valve 8 is normally maintained seated and is not intended to open unless an excessive or abnormal pressure is reached within the casing. The tension of the spring 8' may be adjusted by loosening or tightening the screw plug $8^2$. The valve 7' and its mounting is identical with the valve 8 except that it seats in an opposite direction.

The operation of the device is as follows: The coil spring 15 is normally maintained under a slight tension and when the body 35 moves toward the axle 37 as a result of a compression of the vehicle springs, the coil spring 15 will take up the slack in the strap 34. When the body 35 is moved away from the axle as a result of the rebound of the vehicle springs, the strap 34 will be placed under tension. As the strap 34 is connected with the housing the housing will be turned about the barrel 10 as an axis in a clockwise direction as seen in Fig. 2. As the projection 4 is keyed to the housing, it will turn with the housing and the liquid in the chamber C will be trapped between the projection 4 and the vane 12. Due to the peculiar shape and mounting of the vane 12, it will be seen that the vane 12 will be forced against the side wall of the housing by the pressure of the liquid and as the liquid in the chamber can escape only around the ends of the vane 12 it will be seen that the rebound movement of the body will be checked. As the coil spring 15 is connected at one end with the barrel 10 and at its opposite end with the housing 1, it will also be seen, that the spring 15 will also be placed under tension. The valve 8 will be held to its seat by the spring 8' and will not open unless excessive pressure is reached in the chamber. When the vehicle body again returns to normal position the spring 15 will return the housing to its normal position and during this return movement the liquid on the back side of the projection 4 will escape freely past the vane 12, the vane 12 being pivotally mounted on the trunnion or lug 11. Due to the peculiar shape of the cover 26 and that portion of the housing around which the strap 34 extends, it will be seen that during the first movement of the housing in a clockwise direction with respect to the barrel 10, the movement of the projection 4 toward the vane 12 will be comparatively rapid and that during the latter part of this movement it will be slowed down considerably as a result of the change in lever arm. The screws 23 and 24 may be adjusted so that the checking of the rebound may be regulated as desired. The screw 22 may be set so that it projects into the casing a shorter distance than the screw 23 and the block or ring 3 will then be slightly deflected or warped in a plane perpendicular to the axis of the housing due to the pressure of the liquid against that side of the block. This warping of the block 3 will provide a greater clearance at the end of the vane 12 with the result that the checking of the movement of the housing will be gradual. In other words, the clearance at the ends of the vane 12 will be greatest during the first movement of the housing and will be gradually decreased to a minimum. One of the main features of this form of the invention is that practically all of the parts may be made from metal stampings thus materially cheapening the construction and adapting the device for quantity production at comparatively low cost.

It will be understood that there will be preferably one shock absorber for each vehicle spring in order to obtain the best results and the construction is such that there is no necessity for making a right hand and a left hand shock absorber. The shock absorber shown in Fig. 2 is inverted when used on the opposite side of the vehicle and the strap 34 is wrapped around in the opposite direction. The device will then be filled with liquid through the opening 39' which will then be uppermost. The strap 34 is preferably a wire rope having solder applied to its inner end so that it may be securely clamped between the flanges on the cover and housing. The strap is readily removable and may be wrapped around the housing in the opposite direction when and if desired.

In Fig. 5 I have disclosed a slightly modified form of my invention in which the position of the vane 12 and projection 4 has been reversed. In this form of the invention the principal parts are made of castings instead of metal stampings. It will also be seen by reference to Fig. 5 that the compression chamber is not entirely filled with liquid so that there is a small air chamber or pocket above the level of liquid which gives some additional resilience to the device. In this form of the invention I also provide a by-pass connection between opposite sides of the pivotally mounted vane. This by-pass connection consists of an enlargement 41, which is preferably cast integral with the housing. A bore 42 extends longitudinally through this enlargement and has its opposite ends threaded to receive screw plugs 43 and 44 which are held in adjusted position by lock nuts 45 and 46. The bore 42 communicates with the interior of the housing by means of passageways 47, 48 and 49. The plugs 43 and 44 may be adjusted so as to allow the liquid to flow past or around the vane at a predetermined rate of flow.

Also cast integral with the housing at opposite sides thereof are enlargements 50 each having longitudinally extending bores 51 therein. Each bore 51 communicates with the interior of the housing through a bore or passageway 52. A tapered plug valve 53 is threadedly secured in one end of each bore 51 and the inner end of the plug is tapered and seats in a restricted portion of the bore as shown. The opposite end of each bore 51 is closed by a screw plug 54 which is threadedly received therein. When it is desired to fill the housing with a liquid such as glycerine or oil, the plug 54 is removed and the plug valve 53 opened. An alemite gun or similar device may be used for this purpose. The housing is first filled completely and then a predetermined amount of the liquid is withdrawn so that the size of the air pocket will be the same in each shock absorber.

When the shock absorber is secured to a vehicle body the lowermost plug 44 is locked in closed position to shut off communication through the passageway 48 and the plug 43 is set in a position to allow a limited flow through passageway 47. In other respects this form of the invention is substantially identical with that shown in Figs. 2 and 3.

It will be understood that the block 4 is keyed to and moves with the housing 1 and that the vane 12 is pivotally secured to the trunnion 11 which is rigidly secured to the barrel 10, which in turn is rigidly secured to the vehicle body. When the housing is turned about the barrel 10 in a clockwise direction the projection 4 will be moved toward the vane 12. During the first movement of the housing the liquid will flow through the passageway 47 and past valve 43 and thence through bore 42 and passageway 49 to the opposite side of the vane 12. After the housing has been turned a short distance the passageway 47 passes beyond the vane 12 and further flow through bore 42 is cut off. Continued movement of the housing tends to compress the air in the air pocket at the top of the compression chamber. Further movement of the housing forces the liquid around the ends of the vane 12 and around the end of the block 4.

During the movement of the housing the spring 15 will be tensioned and when the upward or rebound movement of the vehicle has been checked the spring returns the parts to the position shown in Fig. 4. The clearance at the ends of the vane 12 is regulated and adjusted by means of the screws 23 and 24 as hereinbefore described so that a very accurate adjustment may be obtained.

The position of the block 3 and projection 4 determines the amount of clearance and it will be clear that the rebound of the vehicle body is checked rapidly or slowly in accordance with this adjustment. This form of the invention is also adapted for attachment to either the right hand or left hand side of the vehicle body. In order to adapt a device for use on the opposite side of a vehicle, it is merely necessary to extend the strap 34 around the cover 26 in the opposite directions, reverse the vane 12 and properly adjust the valves 43 and 44. This form of the invention operates in practically the same manner as the preferred form of the invention hereinbefore described but is capable of being adjusted more accurately. Furthermore, in this form of the invention the rebound movement is not checked as suddenly and the air pocket gives some additional resilience. The by-pass connection allows the vehicle body to have a limited unrestricted upward movement which takes care of the minor vibrations or shocks without bringing the shock absorber proper into action.

Various changes may be made in the details of my construction without departing from the spirit of my invention and I wish my invention to be limited only in accordance with the scope of the appended claims.

It will now be clear that I have provided a shock absorber of the class described which accomplishes the objects of the invention as hereinbefore stated.

Having thus described my invention, what I claim is:—

1. In a shock absorber of the class described, a casing, a barrel arranged within said casing and dividing the same into a pair of concentric compartments, an oscillating vane arranged within one of said compartments and pivotally secured to said barrel, means for oscillating said casing about said barrel, means for returning said casing to its original position and means for regulating the movement of said casing with respect to said barrel.

2. In a shock absorber of the class described, a casing, a barrel arranged within said casing and dividing the same into a pair of concentric compartments, said casing being rotatably mounted upon said barrel and said barrel having means for rigidly connecting the same with a vehicle body, a vane pivotally secured to said barrel, means for oscillating said casing about said barrel in one direction, spring means for returning said casing to normal position.

3. In a shock absorber, a casing, a barrel arranged within said casing and dividing the same into a pair of concentric compartments, said barrel having means for connecting the same to a vehicle body, a vane arranged within one of said compartments and pivotally secured to said barrel, a block arranged within said last mentioned compartment and means non-rotatably connecting said block with said casing, a strap connected with said casing and adapted for connection with a vehicle axle whereby said casing will be turned about said barrel when said vehicle body and axle are moved apart and spring means for turning said casing in the opposite direction when said vehicle body and axle approach each other.

4. In combination with a vehicle body and axle, of a shock absorber rigidly secured to said body and having a flexible connection with said axle, said shock absorber comprising a casing, a barrel arranged within said casing and dividing the same into a pair of compartments, a vane arranged within one of said compartments and pivotally secured to said barrel, a block non-rotatably secured to said last mentioned compartment and movable with said casing whereby said casing will be turned about said barrel when said vehicle body and axle are moved apart and spring means arranged within said other compartment for returning said casing to normal position and taking up the slack in said strap when said vehicle body and axle approach each other.

5. In a shock absorber of the class described, a shaft having a vane pivotally secured thereto, a casing surrounding said shaft and defining a compartment, a block arranged within said compartment and non-rotatably secured to said casing, means for adjusting the position of said block with respect to said vane whereby to vary the clearance between the ends of said vane and casing, means for turning said casing about said shaft in one direction and spring means for turning said casing in the opposite direction.

6. In a device of the class described, a drum adapted to be secured to a rigid body, a casing surrounding said drum and cooperating therewith to define a liquid tight compartment, a vane arranged within said compartment and pivotally secured to said drum, a block arranged within said compartment and non-rotatably secured to said casing and means for turning said casing about said drum in one direction and spring means arranged within said drum for turning said casing in the opposite direction.

7. In a shock absorber, a hollow drum, a casing rotatably mounted on said hollow drum, a vane pivotally secured to said hollow drum, a spring secured within said hollow drum and adapted to be tensioned when said casing is rotated, said drum having a portion extending through said casing and adapted for connection to a vehicle body, and a flexible connection secured to said casing and extending around a portion thereof and adapted for connection to a vehicle axle.

8. A shock absorber of the class described comprising a hollow drum, a casing rotatably mounted on said hollow drum, and adapted to be substantially filled with liquid, a vane pivotally secured to said hollow drum and engaging with the wall of said casing, a block slidably mounted on said hollow drum and connected with said casing so as to rotate therewith, said drum having a portion adapted for attachment to a vehicle body, a flexible connection secured to said casing by means of which said casing may be rotated about said drum, frictional means tending to resist the rotation of said casing and means for returning said casing to normal position.

9. A shock absorber of the class described comprising a hollow drum adapted to be secured to the body of a vehicle, a casing rotatably mounted on said hollow drum, said casing being liquid tight and adapted to be filled with liquid, a vane secured to said drum and traversing the space between said drum and the walls of said casing, a block secured within said casing so as to rotate therewith, means for varying the clearance at the ends of said vane, a strap secured to and extending around a portion of said casing by means of which said casing may be turned about said drum in one direction and spring means arranged within said hollow drum and tending to return said casing to normal position.

10. A shock absorber of the class described comprising a hollow drum adapted to be rigidly secured to a vehicle body, a casing rotatably mounted on said hollow drum and closing the end of the same, a coil spring arranged within said drum and having one end secured to said drum and its opposite end secured to said casing, a ring member non-rotatably secured to said drum and having an overhanging portion forming a bearing for said casing, a disk rotatably mounted on said ring member and resting loosely on said overhanging portion and disposed between said overhanging portion and the cover for said casing, a vane secured to said drum and traversing the space between the drum and the walls of said casing, a block arranged within said casing and non-rotatably secured thereto, means for adjusting the position of said block to vary the clearance at the ends of said vane, a strap secured to said casing and extending around a portion of said drum and adapted for connection with a vehicle axle.

11. A shock absorber as set forth in claim 10 in which the portion of said casing around which said strap extends is oval in shape.

12. In a shock absorber of the class described, a drum, a casing rotatably mounted on said drum, a vane pivotally connected to said drum and traversing the space between the walls of said casing and said drum, and spring means arranged within said drum and tending to rotate said casing in one direction.

13. In a shock absorber for vehicles, a drum adapted to be rigidly secured to a vehicle body, a casing rotatably mounted on said drum, said drum dividing said casing into a pair of concentric compartments, a vane carried by said drum and traversing the space between the walls of said casing and said drum, said vane being movable with respect to said drum, and spring means arranged within said drum and tending to rotate said casing in one direction.

14. In a shock absorber for vehicles, a drum adapted to be rigidly secured to a vehicle body, a casing rotatably mounted on said drum, said drum dividing said casing into a pair of compartments, a vane pivotally secured to said drum and traversing the space between the walls of said casing and said drum, and spring means arranged within said drum and tending to rotate said casing in one direction.

15. In a shock absorbing device, a casing, a hollow shaft journaled in said casing and dividing the same into a pair of compartments, a vane pivotally mounted in one of said compartments on an axis spaced from and parallel with the axis of said shaft, and spring means arranged within the other of said compartments and tending to cause relative movement between said shaft and casing.

16. In a shock absorber, a casing, a hollow shaft journaled in said casing, a vane pivotally secured to said hollow shaft, a spring arranged within said hollow shaft and adapted to be tensioned when said casing is rotated on said drum and a portion extending through said casing and adapted for connection to a vehicle body, a flexible connection secured to said casing and extending around a portion thereof and adapted for connection to a vehicle axle, the portion about which said flexible connection extends being a curved surface of varying radius.

17. In a shock absorber, a shaft, a vane secured to said shaft so as to have limited movement with respect thereto, a casing surrounding said shaft and defining a working compartment, a block arranged within said working compartment, and means for adjusting the position of said block with respect to said vane whereby to vary the clearance between the ends of the vane and casing.

In testimony whereof, I hereunto affix my signature.

COURTNEY N. MITCHELL.